US008811710B2

(12) United States Patent
Demmeler et al.

(10) Patent No.: US 8,811,710 B2
(45) Date of Patent: Aug. 19, 2014

(54) BANK-NOTE PROCESSING APPARATUS INCLUDING A DEBANDING STATION AND BANK-NOTE PROCESSING METHOD

(75) Inventors: Erwin Demmeler, Memmingen (DE); Peter Dopfer, Geltendorf (DE)

(73) Assignee: Giesecke & Devrient GmbH, Munich (DE)

( * ) Notice: Subject to any disclaimer, the term of this patent is extended or adjusted under 35 U.S.C. 154(b) by 297 days.

(21) Appl. No.: 13/384,701

(22) PCT Filed: Jul. 20, 2010

(86) PCT No.: PCT/EP2010/060474
§ 371 (c)(1), (2), (4) Date: Jan. 18, 2012

(87) PCT Pub. No.: WO2011/009855
PCT Pub. Date: Jan. 27, 2011

(65) Prior Publication Data

US 2012/0134572 A1 May 31, 2012

(30) Foreign Application Priority Data

Jul. 22, 2009 (DE) ......................... 10 2009 034 064

(51) Int. Cl.
*G06K 9/00* (2006.01)

(52) U.S. Cl.
USPC ............................ 382/135; 382/137; 382/140

(58) Field of Classification Search
CPC ............... G06F 19/00; G07D 11/0084; G07D 11/00054; G07D 2207/00; G07D 2211/00; G07F 19/00; G07F 19/20
USPC .......... 382/135, 137, 140; 271/307, 121, 124, 271/37, 109
See application file for complete search history.

(56) References Cited

U.S. PATENT DOCUMENTS 2,529,943 A * 11/1950 Hopkins ......................... 355/24
2,578,320 A * 12/1951 Schubert ......................... 355/23
3,318,212 A * 5/1967 Daniel .......................... 399/309

(Continued)

FOREIGN PATENT DOCUMENTS

DE 2810282 B1 7/1979
DE 4010340 A1 10/1990

(Continued)

OTHER PUBLICATIONS

Search Report of Germany PTO regarding DE 10 2009 025 019.0, Aug. 28, 2009.

(Continued)

*Primary Examiner* — Stephen R Koziol
*Assistant Examiner* — Shaghayegh Azima
(74) *Attorney, Agent, or Firm* — Workman Nydegger

(57) ABSTRACT

A bank-note processing apparatus includes a debanding station and an image capturing device by which first and second information items applied to the band can be optically captured and digitally stored. The image capturing device includes at least one mirror, preferably two symmetrically arranged mirrors, in order for information items on the band that lie on different sides of the bank-note stack on the banded bank-note stack to be able to optically captured simultaneously. The image capture can be effected before or after the removal of the band from the bank-note stack.

13 Claims, 5 Drawing Sheets

(56) References Cited

U.S. PATENT DOCUMENTS

| | | | | | |
|---|---|---|---|---|---|
| 4,035,073 | A | * | 7/1977 | Del Vecchio | 355/24 |
| 4,236,639 | A | * | 12/1980 | Boettge et al. | 209/534 |
| 4,431,179 | A | | 2/1984 | Westover et al. | |
| 4,524,963 | A | * | 6/1985 | D'Angelo et al. | 271/3.12 |
| 4,673,285 | A | * | 6/1987 | Shogren | 355/23 |
| 5,074,739 | A | | 12/1991 | Takahashi et al. | |
| 5,324,024 | A | * | 6/1994 | Mori | 271/296 |
| 6,098,373 | A | * | 8/2000 | Ashikawa et al. | 53/381.2 |
| 6,891,180 | B2 | * | 5/2005 | Holl et al. | 250/556 |
| 2001/0042355 | A1 | * | 11/2001 | Yamamoto et al. | 53/399 |
| 2003/0059098 | A1 | * | 3/2003 | Jones et al. | 382/135 |
| 2003/0132402 | A1 | * | 7/2003 | Holl et al. | 250/556 |
| 2005/0209966 | A1 | * | 9/2005 | Demmeler et al. | 705/45 |
| 2005/0241270 | A1 | * | 11/2005 | Katsumata | 53/64 |
| 2007/0227323 | A1 | * | 10/2007 | Meyer | 83/24 |
| 2008/0037856 | A1 | * | 2/2008 | Paraskevakos | 382/140 |
| 2011/0090485 | A1 | * | 4/2011 | Cronin et al. | 356/71 |

FOREIGN PATENT DOCUMENTS

| | | | | |
|---|---|---|---|---|
| DE | 102006014827 | | | 4/2007 |
| DE | 102006014827 | A1 | | 10/2007 |
| GB | 2018442 | A | | 10/1979 |
| GB | 2056415 | | | 3/1981 |
| GB | 2056415 | A | * | 3/1981 |
| GB | 2128592 | | | 5/1984 |
| GB | 2128592 | A | * | 5/1984 |
| WO | 03107279 | | | 12/2003 |

OTHER PUBLICATIONS

International Search Report in PCT/EP2010/060474, Oct. 12, 2010.

* cited by examiner

BANK-NOTE PROCESSING APPARATUS INCLUDING A DEBANDING STATION AND BANK-NOTE PROCESSING METHOD

BACKGROUND OF THE INVENTION

1. Field of the Invention

This invention relates to a method and an apparatus for processing bank notes that are made available in a banded state.

2. Related Art

Bank-note packs that are supplied to a bank-note processing machine are usually strapped with bands. To be able to process the bank notes in the machine, the bands are first removed. The debanded bank notes are subsequently singled and checked in the bank-note processing machine. In so doing, measuring data and/or serial numbers of each individual bank note are captured. Finally, the bank notes are deposited in one or several storage pockets for further processing.

Such a bank-note processing machine is known for example from DE 10 2006 014 827. Therein is also described a debanding station which is connected upstream of each sheet-material singler. The bank-note stacks to be debanded are taken by means of a gripper from pockets which are transported along a transport path, and are supplied to a debander where the bands are cut through by means of a cutting device and removed by means of a stripping device and disposed of. The debanded sheet material is then put back in the pockets in order to be subsequently singled, checked and sorted.

It is further proposed in DE 10 2006 014 827 A1 to provide a photo station or a reading device in the debander in order to photographically capture information on the band or to read data on the band. The reading of the data can be effected for example by means of a bar code reader or OCR scanner. The photos and data are then stored in connection with a code for that input pocket in which the associated sheet-material stacks are transported. The information typically stated on the bands involves for example the denomination of the bank notes of the bank-note pack, the number of bank notes in the bank-note pack, information on the deliverer of the bank-note pack, such as for example the name, logo or another indicator of the delivering bank and/or signature, stamp, name, etc., of the teller of the delivering bank, information on the preparation of the pack by means of another bank-note processing machine or other information for identifying the bank-note pack.

To completely capture the information contained on the band, the band must be photographed from both sides of the bank-note pack. This is due to the fact that information items can be present on the bands both on the upper sides of the bank-note packs and on the undersides of the bank-note packs. One possibility would be to turn over the bank-note pack or the band between the two recordings and to photograph the two sides of the band successively by means of two photo recordings. However, this is elaborate technically and time-wise, especially in bank-note processing machines with a high throughput of bank-note packs.

SUMMARY OF THE DESCRIPTION

Hence, the object of the present invention is to completely capture the information provided on the bands of banded bank-note packs with minimal technical effort and in a short time.

According to the invention, the information items applied to a band are still captured by means of an image capturing device, i.e. in particular by photographic means or alternatively by means of a scanner. However, only one image is created. In order to guarantee this and nevertheless capture all the information items, the invention provides for optically capturing information items from different portions of the band simultaneously while employing at least one mirror, so that all the information items are combined on one image. There is thus required only one image capturing device, for example a conventional digital camera, by means of which a photographic image is digitally storable. The image capturing device can be arranged in stationary fashion.

In this way, different information items located on different sides, in particular on the upper side and underside, of the bank-note stack on the banded bank-note stack can be captured in simple fashion and in a short time. The image capture can be effected here either before the removal of the band from the bank-note stack, or after the removal from the bank-note stack before the band is disposed of.

The image capturing device preferably has a camera which is so arranged that at least one portion of the band is reflected to the camera via a mirror. For example, a first portion of the band, e.g. the upper side, is recorded by the camera after reflection by a first mirror, and a second portion of the band, e.g. the underside, after reflection by a second mirror. The band is thus recorded by the camera simultaneously from two different sides. This makes it possible for first information items contained in a first portion of the band and second information items contained in a second portion of the band to be captured with the camera simultaneously. The two portions can be the upper side and the underside of a folded band.

Alternatively, the two portions can also be the two opposing sides of an (unfolded) band which is provided with information items on both its opposing sides. For example, a band printed on both sides, after being drawn off the bank-note pack, can be so arranged that it spans a plane (i.e. unfolded) and the information items of the two mutually opposing portions of this band is captured with the camera simultaneously.

In principle, the invention merely requires a single mirror. If, for example, the objective of a camera is directed onto the band from one side, the image capture area that can be reached by the objective can be adjusted so far beyond the band that a mirror arranged laterally behind the band lies in the capture area via which the back side of the band is simultaneously also captured and recorded. However, the recording planes are at different distances away from the objective, so that the necessary recording quality can in some cases only be guaranteed by additional technical means.

Hence, it is technically more favorable to employ at least two mirrors, so that a different portion of the band is optically capturable via each of the two mirrors. In this way there can be produced a first ray path between a first portion of the band and the image capturing device while employing the first mirror, and a second ray path between a second portion of the band and the same image capturing device while employing the second mirror. The two ray paths are preferably symmetrical, in particular mirror-symmetrical, to each other, so that the recording conditions for the two captured band portions are the same if possible. In this case, the image capturing device, i.e. in particular the optical axis of the recording objective, and the middle plane of the band preferably lie in the symmetry plane, and the two mirrors are arranged symmetrically on opposing sides with respect to the symmetry plane such that mutually opposing portions of the band are capturable by means of the image capturing device simultaneously.

Any other ray paths can of course also be realized, in particular while employing additional mirrors. This can be expedient mainly for reasons of space.

According to a preferred embodiment of the invention, the image recording is effected only after the removal of the band from the bank-note stack. For this purpose, the band is cut through on one side by means of a cutting device and removed from the bank-note stack by means of a stripping device, as is basically known from the prior art. However, the removal of the band is effected such that two portions of the band come to lie one over the other. Ideally, the band is thereby folded once. This can be realized for example by the band being drawn off the bank-note stack by means of a hook. The hook simultaneously defines the folding line. The information provided on the band on the upper side of the bank-note pack is then present on the upper-side portion of the thus folded band, while the information provided on the band on the underside of the bank-note pack lies on the underside portion of the folded band. By employing one or several mirrors, both information items can be captured simultaneously in the previously described fashion.

According to a preferred development of the invention, the band stripped off the bank-note stack is photographed between two transparent elements, in particular between glass plates, in order to then optically capture the information items applied to the band on both sides through the two transparent elements. The band is ideally thereby clamped by means of the two transparent elements.

According to a further preferred embodiment of the invention, the image capturing device comprises a drum or a different rotatable receiving means for the band removed from the bank-note stack. In a first drum position, the drum accepts the band removed from the bank-note stack. In a second drum position, the information items applied to the band are captured in the previously described fashion. In a third drum position, the band is then separated from the drum and preferably disposed of. Such a system can also be subsequently fitted in bank-note processing apparatuses already in operation.

The separation of the band from the drum out of the third drum position is preferably realized by means of compressed air. A compressed-air connection is in general available. A blowing nozzle can easily be provided at a desired place. The blowing out, preferably with the additional help of gravity, can in this way be ensured reliably and with a small amount of noise.

The bands are photographed on both sides in order for the bank notes, after debanding, to still be assignable to the input bank-note pack in the further course of the bank-note processing. The debanded bank notes are singled and checked in the bank-note processing apparatus, whereby measuring data and/or the serial number of each individual bank note are captured. There is subsequently assigned to the measuring data and/or the serial number of the bank note the image of the band of that bank-note pack to which the respective bank note belongs. Optionally, the image of the band can be subjected to image processing or OCR recognition in order to edit the image of the band or to extract information items contained therein. Additionally or instead of the band image, there can also be assigned to the respective bank note the information extracted from the band image.

Further, there can be selectable from the captured image of the band a partial image which contains at least that section of the captured image that contains the first and second information items applied to the band that lie on different sides of the bank-note stack on the banded bank-note stack. The partial image can be selectable manually. For example, it can be provided that the position and size of the selected partial image is adjustable by software on the bank-note processing apparatus. However, the selection of the partial image can also be effected automatically. For example, the position and size of the selected partial image can be preset for the particular bank-note processing apparatus, so that the correct partial image is automatically selected after the image capture. The selection of the partial image has the advantage that the amount of data of the image data to be processed further or stored can be kept small.

Upon the checking of the bank notes, those bank notes are usually sorted out that do not fulfill certain specified criteria and/or that cannot be identified. Hitherto the sorted-out bank notes of a certain bank-note pack have been automatically transported together with the band associated with this pack into a reject pocket of the bank-note processing apparatus. The sorted-out bank notes were then subjected to a separate manual check later. The assignment of the sorted-out bank notes to the correct input pack was thereby effected through the band physically present in the reject pocket.

Through the complete photographing of the band and the assignment of the image of the band to the measuring data and/or to the serial number of the respective bank note, it is no longer necessary to transport the band for the sorted-out bank notes and store it physically therewith. For the sorted-out bank notes the associated input pack can instead be easily ascertained using the band image, which is assigned to the respective measuring data and/or the respective serial number, and/or using the information items extracted from the band image. A further advantage is that the sorted-out bank notes can then be subjected to a new machine check through the bank-note processing apparatus, instead of the hitherto usual manual check. Through the new machine check the number of sorted-out bank notes is reduced, so that fewer sorted-out bank notes also need to be subjected to a new manual check.

DESCRIPTION OF THE DRAWINGS

Hereinafter the invention will be explained by way of example with reference to the accompanying drawings. Therein are shown.

DETAILED DESCRIPTION OF PREFERRED EMBODIMENTS OF THE INVENTION

Figure 1:
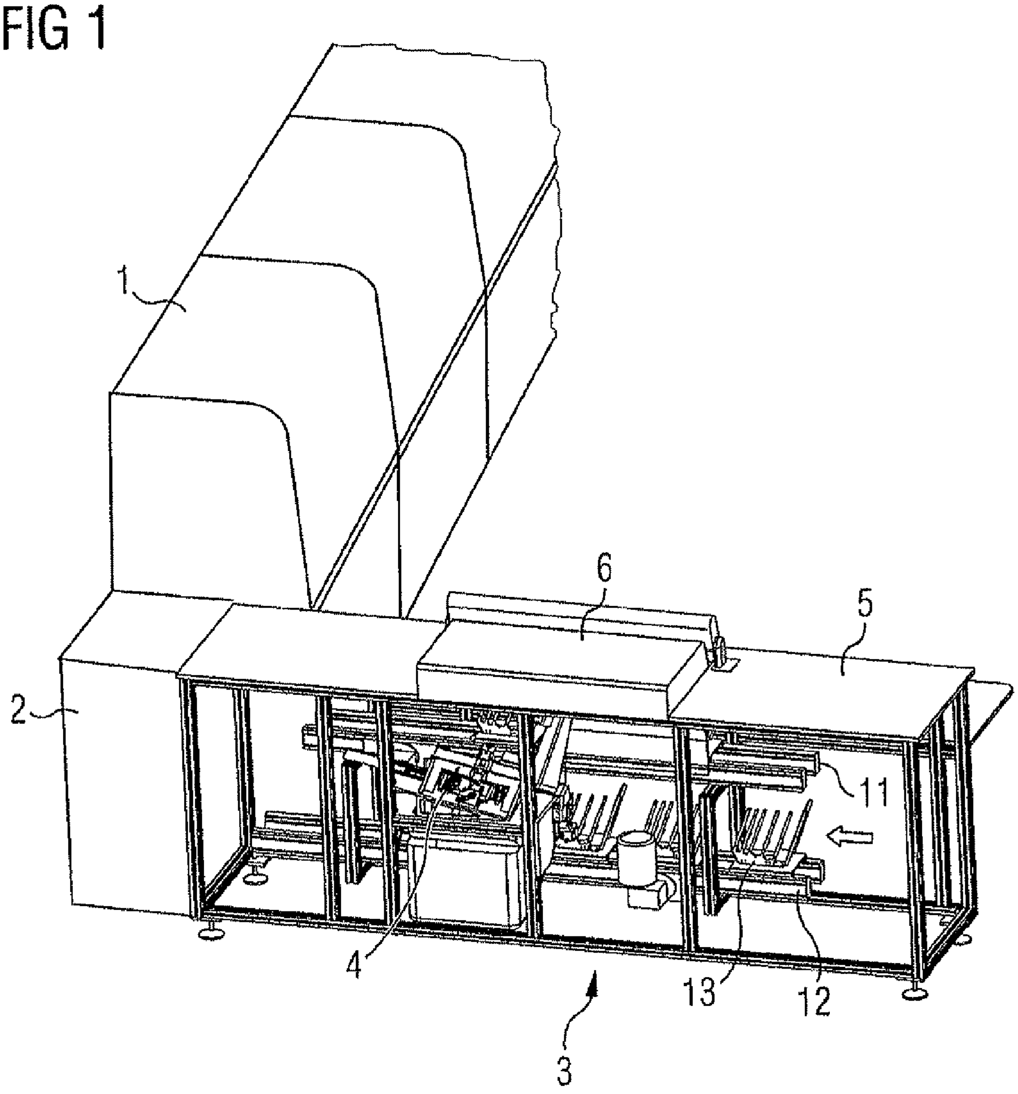
FIG. 1 the general structure of a bank-note processing apparatus.

In FIG. 1 there is represented a bank-note processing apparatus with a bank-note sorting machine 1 which serves e.g. for checking freshly printed bank notes and/or for checking the state and/or type (currency or denomination) of used bank notes. The bank notes are supplied to the bank-note processing apparatus in packs. The packs are strapped with bands which are provided with information items for identifying the bank notes, e.g. about the type of the bank notes and/or about their origin, e.g. the depositor of the pack. There is connected upstream of the sorting machine 1 a singler 2 with which the bank notes are singled, so that they can be checked separately in the sorting machine 1. The bank-note stacks to be checked are made available in input pockets 13 and supplied to the singler 2 by means of an apparatus 3.

The supplying apparatus 3 in FIG. 1 possesses two transport paths 11, 12 on which the pockets 13 are automatically transported on rails. The upper transport path 11 serves here to transport the pockets 13 with the bank notes to the singler 2. The lower transport path 12 serves to transport the pockets 13 back after the bank notes have been removed from the respective pocket 13 by the singler 2. To improve the clarity, transport units that move the pockets 13 from the lower transport path 11 to the upper transport path 12 are not represented. Bank-note stacks are inserted into the pockets 13 in the upper transport path 11 manually by an operator. Likewise, an automatic filling of the pockets 13 can be effected.

The debanding of the bank-note stacks is subsequently effected completely automatically. For this purpose there is used a debanding station 4 which is housed along the transport path 11 in a space-saving manner below a work table 5, on which an operator's console 6 is also provided for monitoring and control of the entire process by an operator. The debanding process comprises the cutting through of the bands by means of a cutting device (not represented) along one side of the bank-note stack. In so doing, the cutters of the cutting device are guided past the longitudinal side edges of the bank notes and can pass in between neighboring bank notes to guarantee a reliable cutting through of the bands without damaging the bank notes. On the side opposing the cutting device, a stripping device with a gripper serves for stripping and removing the cut-through bands. The debanding station 4 and its mode of operation is described in detail in DE 10 2006 014 827 A1, and reference is made thereto to this extent here.

Figure 2:
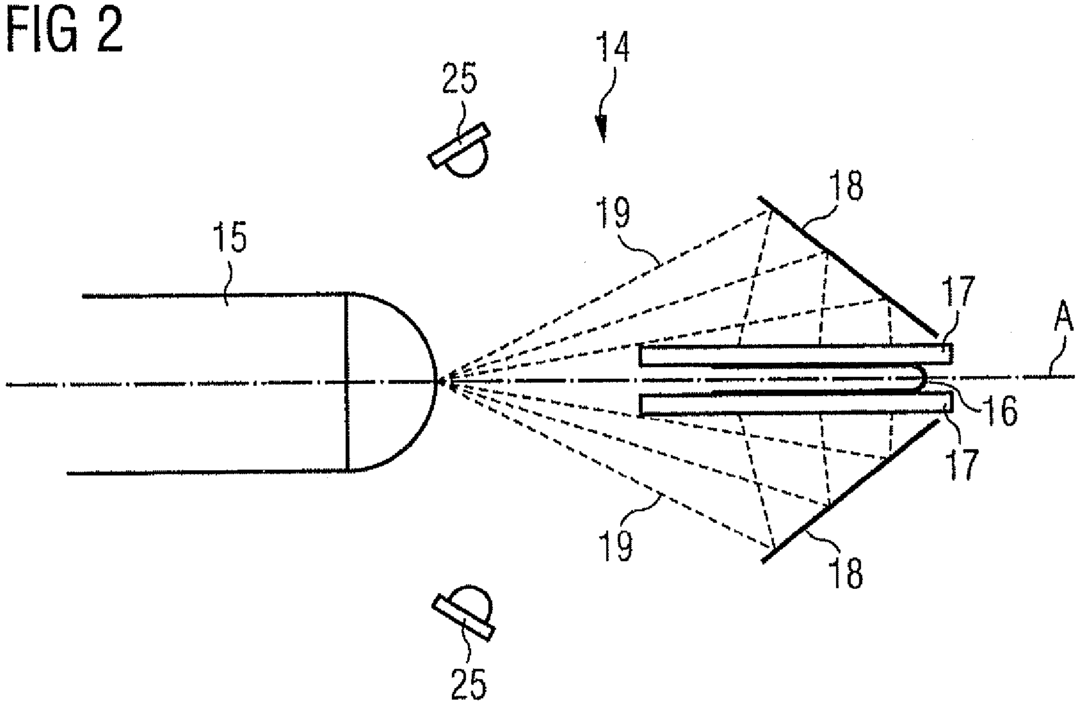
FIG. 2 the principle of the simultaneous recording of two opposing surfaces of a folded band, and FIGS. 3A to 3C an image capturing device comprising a drum in three different turning positions.

Instead of now disposing of the band in a collecting vessel, however, it is supplied by means of the gripper or hook to a transport system and transported away from the debanding station. Upon debanding, the upper side and underside of the band are folded onto each other. The transport system supplies the folded band to a downstream image capturing device. In FIG. 2 there is represented schematically such an image capturing device according to a preferred embodiment example. In this embodiment example, the image capturing device 14 possesses a camera 15 with which there can be made photographic recordings of the band 16 which is clamped in folded fashion between two glass plates 17. The arrangement is illuminated by means of two illumination devices 25. Instead of a photo camera there can of course also be employed a scanner or another image recording system. Via two mirrors 18 oriented symmetrically to the optical axis A the upper side and the underside of the folded band 16 are capturable by means of the photo camera 15 simultaneously. Expediently, the band 16 also lies on the optical axis A. The ray paths 19 on each side of the optical axis A are accordingly identical.

Figure 3A:
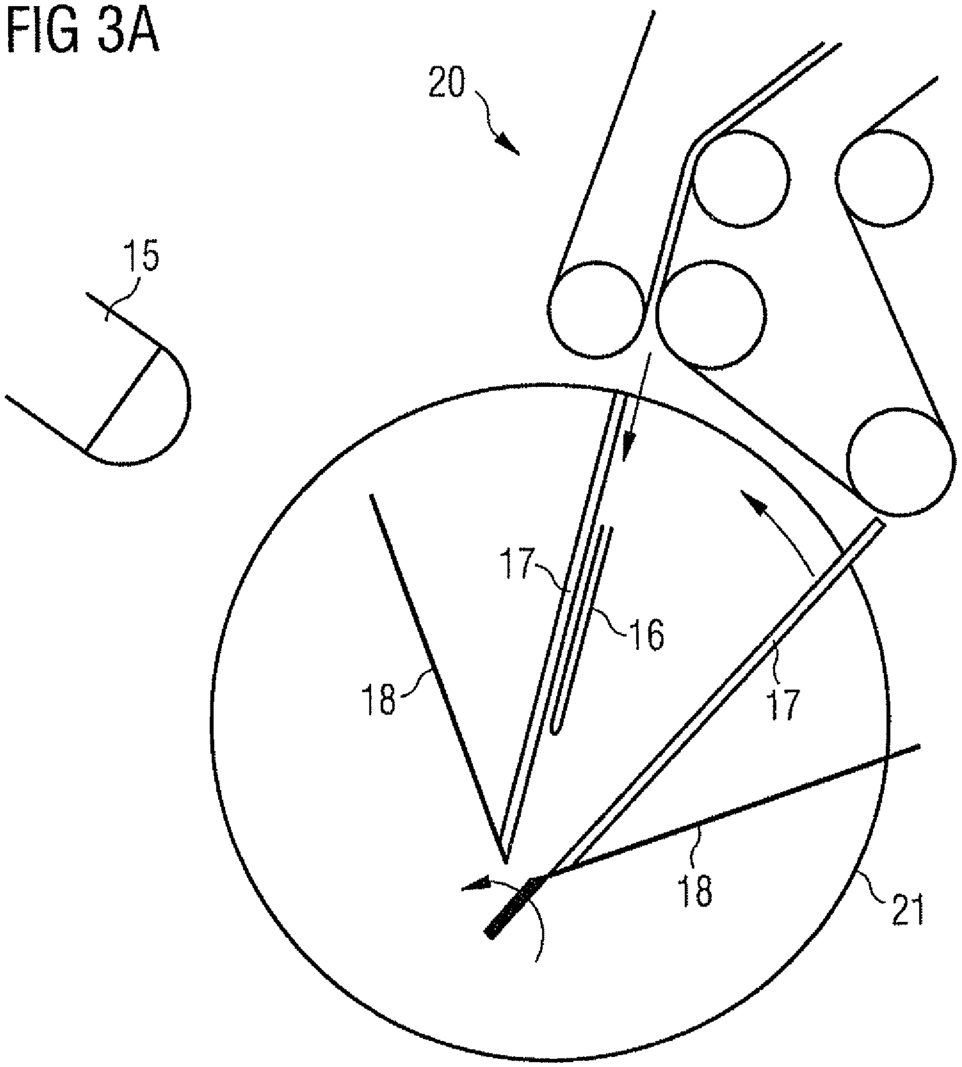
Figure 3B:
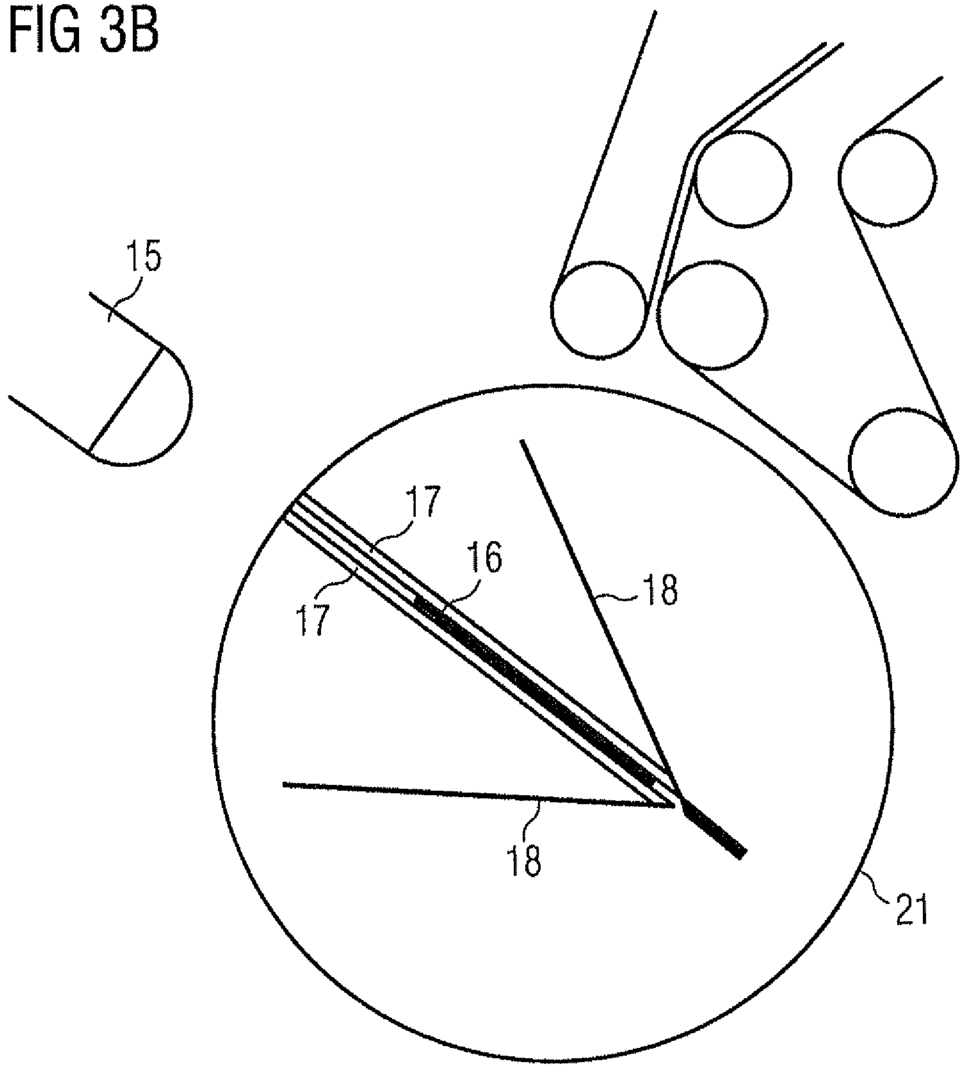
Figure 3C:
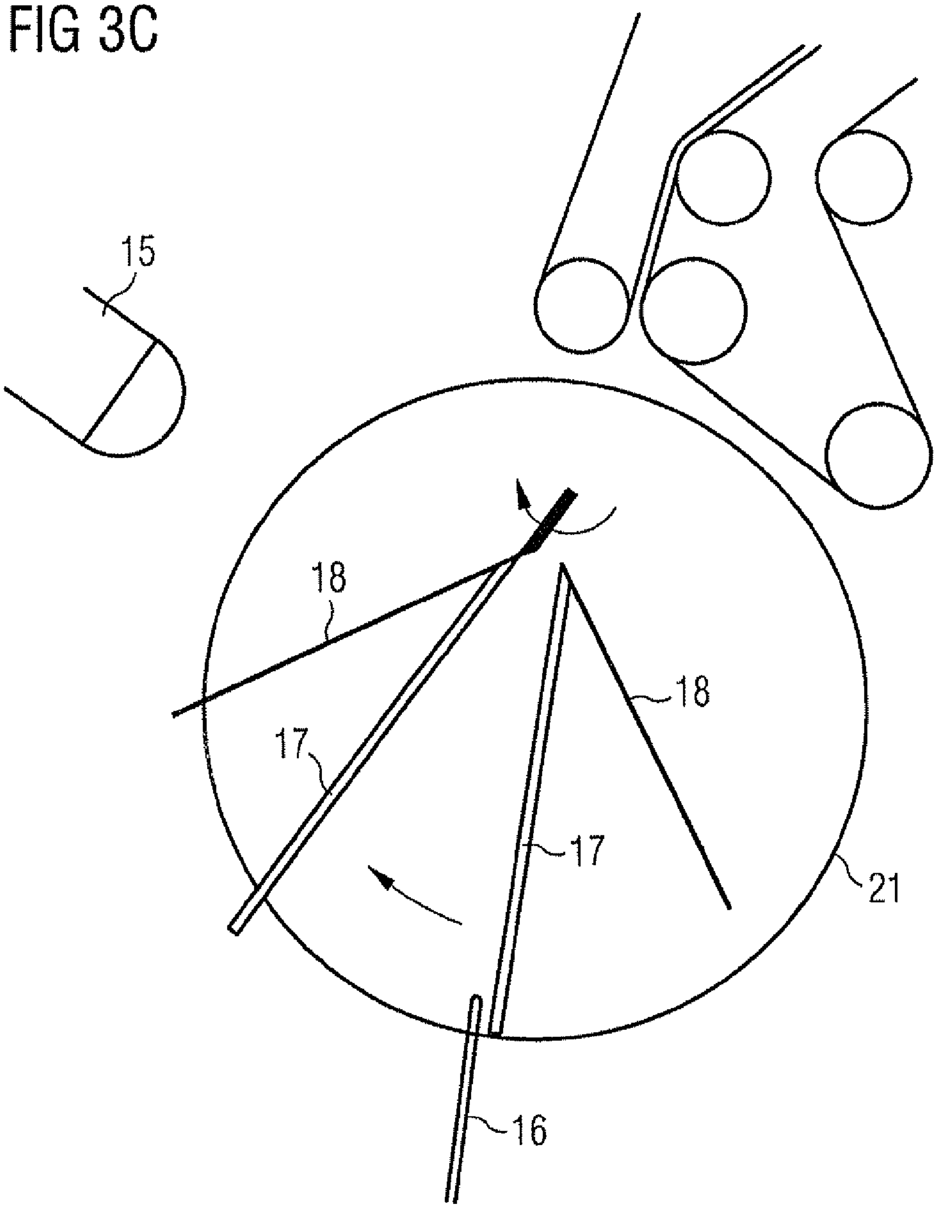

FIGS. 3A to 3C show a concrete embodiment example for the image capturing device schematically represented in FIG. 2. The transport system with which the band 16 is supplied to the image capturing device 14 is realized here as a belt transport device. The glass plates 17 between which the band 16 is received and the mirrors 18 are mounted on a rotatable drum 21. The camera 15 is installed stationarily with respect to the rotatable drum 21. The two glass plates 17 are adapted to be swung open to be able to receive the band 16 therebetween, and can be swung closed to clamp the band 16 therebetween. For this purpose, one of the two glass plates 17 is mounted in swivelable fashion on the drum 21. Firmly connected to this swivelable glass plate 17 is one of the two mirrors 18, although this is not compulsory.

FIG. 3A shows the moment when a band 16 undone on one side is introduced in the folded state between the two glass plates 17 swung away from each other. The supplying is effected from above, so that gravity assists in this process. As soon as the band 16 has been supplied, the two glass plates are swiveled toward each other such that the band 16 is stuck therebetween.

Now the drum 21 is rotated into a second position, which is represented in FIG. 3B. In this second position the image recording is effected according to the principle described with respect to FIG. 2 via the two mirrors 18 by means of the camera 15 through the two glass plates 17. In this way, both sides of the folded band 16 are captured simultaneously. The photographically produced image of the band can be subjected to image processing in order to edit the image of the band, and/or be subjected to OCR recognition in order to extract the information contained therein. The image and the extracted information can then be assigned to the measuring data and/or the serial numbers of those bank notes that belonged to the relevant band.

After the image capture has been effected, the drum 21 turns from the second position to a third position, which is represented in FIG. 3C. After this third position is reached, at the latest, the two glass plates 17 are swung apart, so that the band 16 can fall out of the image capturing device downward under the influence of gravity. This is preferably supported by a compressed-air device, which is not represented in FIG. 3C because it is expediently mounted in a different plane from that represented in FIG. 3C. The band can thereafter either be disposed of immediately, or be transported further for further processing or storage.

The invention claimed is:

1. A bank-note processing apparatus that is arranged to receive a bank-note stack in a banded state, comprising:

- a debanding station where the band is removed from the bank-note stack;
- an image capturing device arranged to optically capture first and second information items applied to the band and to digitally store the information;
- the image capturing device comprising at least one mirror which is arranged in the bank-note processing apparatus in a manner such that any first and second information items applied to the band that lie on different sides of the banded bank-note stack are optically capturable by the image capturing device simultaneously,
- wherein the debanding station is arranged to open a band and transport the opened band away from the bank-note stack such that two portions of the band lie one over the other, the image capturing device being arranged to optically capture the band portions lying one over the other from opposing sides simultaneously.

2. The bank-note processing apparatus according to claim 1, wherein the image capturing device comprises a camera which is so arranged that at least one portion of the band is reflected to the camera via the at least one mirror, wherein the first and second information items are capturable with the camera simultaneously.

3. The bank-note processing apparatus according to claim 1, wherein two mirrors are so arranged that a different portion of the band is optically capturable via each of the two mirrors by means of the image capturing device.

4. The bank-note processing apparatus according to claim 1, wherein the debanding station is arranged to open the band on one side and to fold the opened band, while the opened band is being transported away, such that the two band portions come to lie one over the other.

5. The bank-note processing apparatus according to claim 1, wherein the image capturing device comprises a rotatable receiving device which is arranged in a first position to accept the band removed from the bank-note stack, in a second position to arrange the band such that the first and second information items can be captured simultaneously, and in a third position to part with the band.

6. The bank-note processing apparatus according to claim 1, wherein the image capturing device comprises two transparent elements which are arranged to receive the band between the two transparent elements during the optical information capture.

7. The bank-note processing apparatus according to claim 6, wherein the two transparent elements are movable between an open arrangement in which they are ready to accept the band, and a closed arrangement in which the band is clamped between the elements.

8. A method for processing banded bank-note stacks, comprising the steps of:

removing the band from a bank-note stack, optically capturing first and second information items applied to the band and lying on different sides of the bank-note stack, and storing the optically captured first and second information items in digital form, wherein the first information item and the second information item are optically captured simultaneously while employing at least one mirror, wherein the step of removing the band from the bank-note stack comprises opening of the band and transporting the opened band away from the bank-note stack in a manner such that two portions of the band lie one over the other and the first information item lies on a first one of the two portions and the second information item lies on a second one of the two portions.

9. The method according to claim 8, including the step of producing a first ray path between a first portion of the band and an image capturing device while employing at least a first mirror, and a second ray path between a second portion of the band different from the first portion and the image capturing device while employing at least a second mirror.

10. The method according to claim 8, wherein the opening of the band is effected on one side and the open band is folded, while being transported away, such that the two portions come to lie one over the other.

11. The method according to claim 8, including the steps of rotating the band removed from the bank-note stack out of a first position to a second position in which the optical information capture is effected, and from the second position to a third position from which the band is transported further or disposed of.

12. The method according to claim 11, including the step of removing the band out of the third position by using compressed air.

13. The method according to claim 8, including the step of receiving the removed band between two transparent elements arranged to be swung open and closed, and wherein the optical capturing of the first and second information items is effected through the two transparent elements.

* * * * *